United States Patent
Iwakata (10) Patent No.: US 10,060,532 B2
(45) Date of Patent: Aug. 28, 2018

(54) OIL SEAL

(71) Applicant: KOMATSU LTD., Minato-ku, Tokyo (JP)

(72) Inventor: Keisaku Iwakata, Tochigi (JP)

(73) Assignee: KOMATSU LTD., Tokyo (JP)

( * ) Notice: Subject to any disclaimer, the term of this patent is extended or adjusted under 35 U.S.C. 154(b) by 481 days.

(21) Appl. No.: 14/768,738

(22) PCT Filed: Jan. 7, 2014

(86) PCT No.: PCT/JP2014/050042
§ 371 (c)(1),
(2) Date: Aug. 18, 2015

(87) PCT Pub. No.: WO2014/132674
PCT Pub. Date: Sep. 4, 2014

(65) Prior Publication Data
US 2016/0003359 A1 Jan. 7, 2016

(30) Foreign Application Priority Data
Feb. 27, 2013 (JP) .................. 2013-037640

(51) Int. Cl.
*F16J 15/32* (2016.01)
*F16J 15/3232* (2016.01)
(Continued)

(52) U.S. Cl.
CPC ......... *F16J 15/3232* (2013.01); *F16J 15/164* (2013.01); *F16J 15/322* (2013.01); *F16J 15/3228* (2013.01); *F16J 15/3252* (2013.01)

(58) Field of Classification Search
CPC ........ F16J 15/164; F16J 15/16; F16J 15/3228; F16J 15/3244
See application file for complete search history.

(56) References Cited

U.S. PATENT DOCUMENTS 3,472,519 A * 10/1969 Gehret .................... F16C 19/28
277/351
5,009,435 A * 4/1991 Villanyi ............... F16J 15/3232
277/552
(Continued)

FOREIGN PATENT DOCUMENTS

CN 1863610 A 11/2006
CN 101493122 A 7/2009
(Continued)

OTHER PUBLICATIONS

Chinese Office Action (and English translation thereof) dated Jun. 8, 2016, issued in counterpart Chinese Application No. 201480009713.2.
(Continued)

*Primary Examiner* — Vishal A Patel
(74) *Attorney, Agent, or Firm* — Holtz, Holtz & Volek PC (57) ABSTRACT

An oil seal, which is provided on an outer circumference of a crankshaft to prevent leakage of two fluids such as a lubricating oil and an engine oil, includes: a first seal that seals a flywheel side; a second seal that seals an engine side; a pressure release hole provided to at least one of the first seal and the second seal so that a space surrounded by the first seal, the second seal and the crankshaft is in communication with one of the flywheel side and the engine side through the pressure release hole; and a partitioning lip provided between the first seal and the second seal to divide the space.

4 Claims, 4 Drawing Sheets

(51) Int. Cl.
*F16J 15/16* (2006.01)
*F16J 15/3228* (2016.01)
*F16J 15/322* (2016.01)
*F16J 15/3252* (2016.01)

(56) References Cited

U.S. PATENT DOCUMENTS

| | | | | |
|---|---|---|---|---|
| 5,035,436 | A * | 7/1991 | Rockwood | F16J 15/004 |
| | | | | 277/410 |
| 6,293,558 | B1 * | 9/2001 | Crapart | F16J 15/006 |
| | | | | 277/551 |
| 7,090,223 | B2 * | 8/2006 | Reinhard | F16J 15/004 |
| | | | | 277/551 |
| 2003/0168817 | A1 * | 9/2003 | Iwakata | F16J 15/164 |
| | | | | 277/549 |
| 2004/0130101 | A1 | 7/2004 | Osako et al. | |
| 2005/0073110 | A1 | 4/2005 | Armour et al. | |
| 2008/0289926 | A1 | 11/2008 | Olenzek et al. | |
| 2010/0253005 | A1 * | 10/2010 | Liarakos | F16J 15/164 |
| | | | | 277/353 |

FOREIGN PATENT DOCUMENTS

| | | |
|---|---|---|
| CN | 101788055 A | 7/2010 |
| CN | 101936397 A | 1/2011 |
| CN | 202301953 U | 7/2012 |
| DE | 3236636 A1 | 4/1984 |
| GB | 1541264 A | 2/1979 |
| GB | 2258275 A | 2/1993 |
| JP | 52022650 A | 2/1977 |
| JP | 54006456 U | 1/1979 |
| JP | 57041502 Y2 | 9/1982 |
| JP | 60084860 U | 6/1985 |
| JP | 60112755 U | 7/1985 |
| JP | 2003262275 A | 9/2003 |
| JP | 2004156702 A | 6/2004 |

OTHER PUBLICATIONS

International Search Report (ISR) dated Apr. 1, 2014 issued in International Application No. PCT/JP2014/050042.
International Preliminary Report on Patentability (IPRP) including Written Opinion (in English) dated Sep. 11, 2015, issued in parent International Application No. PCT/JP2014/050042.

* cited by examiner

OIL SEAL

TECHNICAL FIELD

The present invention relates to an oil seal and, in particular, to a two-fluid oil seal.

BACKGROUND ART

A known example of a typical oil seal is a two-fluid oil seal provided between an outer circumference of an engine crankshaft and an inner circumference of a flywheel housing. The two-fluid oil seal includes a pair of lips that seal an engine side and a flywheel side to prevent leakage of two oils, such as an engine oil supplied to the crankshaft and a lubricating oil supplied to components of the flywheel (e.g., a clutch disc and a transmission), from one side to the other side.

The lips of the two-fluid oil seal are each provided with a helical groove on a surface in contact with the crankshaft so that an oil that is leaking into a space between the lips is discharged out of the space. When the oil is leaking into the space between the lips, the rotation of the crankshaft makes the oil flow into the groove, and then the oil is helically discharged outside as the crankshaft rotates.

However, since air in the space is also discharged along with the oil discharged out of the space, the pressure in the space becomes negative. The lips are thus forced against the crankshaft, thereby accelerating wear of the oil seal. As a result, the sealing performance and durability of the oil seal may be deteriorated. Accordingly, the two-fluid oil seal employs an arrangement where one of the lips (e.g., a flywheel-side lip) is provided with a pressure release hole (see, for instance, Patent Literatures 1 to 3).

An oil seal disclosed in Patent Literature 1 includes a first seal that seals a flywheel side and a second seal that seals a crankshaft side. The first seal is provided with a communication hole through which a space surrounded by the first seal, the second seal and the crankshaft is in communication with a space inside a flywheel housing.

An oil seal disclosed in Patent Literature 2 similarly includes a pair of seal members that are brought into contact with a crankshaft to isolate first and second lubricating oil chambers from each other. One of the seal members of this oil seal is provided with a communication passage through which a space of one of the isolated spaces and an annular gap between the seal members are in communication with each other.

An oil seal disclosed in Patent Literature 3 includes a pipe through which a space between a pair of lips and a flywheel-side space (a mission room) are in communication with each other.

CITATION LIST

Patent Literature(s)

Patent Literature 1: JP-A-2003-262275
Patent Literature 2: JP-U-60-112755
Patent Literature 3: JP-U-60-84860

SUMMARY OF THE INVENTION

Problem(s) to be Solved by the Invention

The arrangement of Patent Literature 1 employing the communication hole, the arrangement of Patent Literature 2 employing the communication passage, and the arrangement of Patent Literature 3 employing the pipe entail a problem that an oil may leak into a space between the pair of seal members (lips) from one of the isolated spaces through the communication hole, the communication passage or the pipe and leak into the other isolated space through the helical groove, which may result in a shortage of the oil in the one of the isolated spaces.

Specifically, a flywheel-side oil may leak into the space between the seal members through the communication passage or the like and leak into an engine block through the helical groove of the crankshaft-side lip. In this case, the flywheel-side oil, which leaks into the crankshaft side, may run short.

An object of the invention is to provide an oil seal capable of preventing leakage of a fluid from one of isolated spaces into the other isolated space while exhibiting a sealing performance that is restrained from deteriorating due to wear.

Means for Solving the Problem(s)

According to a first aspect of the invention, an oil seal, which is configured to be set on an outer circumference of a rotary shaft to prevent leakage of a first liquid and a second liquid and defines a first fluid side and a second fluid side for the rotary shaft, includes: a first seal configured to seal the first fluid side; a second seal configured to seal the second fluid side; a pressure release hole provided to at least one of the first seal and the second seal so that a space surrounded by the first seal, the second seal and the rotary shaft is in communication with one of the first fluid side and the second fluid side through the pressure release hole; and a partitioning lip provided between the first seal and the second seal to divide the space into two parts in an axial direction of the rotary shaft.

According to a second aspect of the invention, it is preferable that the pressure release hole be provided to the first seal or the second seal that prevents leakage of the first fluid or the second fluid having a lower contamination degree than the other.

According to a third aspect of the invention, it is preferable that the partitioning lip be provided with a communication hole through which the divided parts of the space are in communication with each other.

According to a fourth aspect of the invention, it is preferable that the pressure release hole and the communication hole be not opposite to each other along an axial line of the rotary shaft.

According to a fifth aspect of the invention, it is preferable that, when an axial line of the rotary shaft is set substantially horizontal, the pressure release hole and the communication hole be located above the axial line.

According to a sixth aspect of the invention, it is preferable that the pressure release hole be located at a far side shifted in a rotation direction of the rotary shaft relative to a top in a vertical direction, and the communication hole be shifted to a near side in the rotation direction of the rotary shaft relative to a position opposite to the pressure release hole.

In the first aspect, the partitioning lip is provided to divide the space surrounded by the first seal, the second seal and the rotary shaft in the axial direction of the rotary shaft. The first fluid or the second fluid leaking into the space through the pressure release hole can thus be directed to either side in the axial direction by the partitioning lip to be discharged. Consequently, the pressure in the space is prevented from becoming negative. Further, even when the pressure release hole for preventing negative pressure is provided and the first fluid or the second fluid leaks into the space therethrough, the fluid can be discharged to the side where the fluid should be kept, thereby preventing mixing of the first and second fluids.

Further, since the first or the second fluid is discharged to the side where the fluid should be kept, a shortage of the first or the second fluid can be prevented.

In the second aspect, the pressure release hole is provided to one of the first seal and the second seal, which prevents leakage of one with a lower contamination degree of the first fluid and the second fluid than the other. The first fluid or the second fluid with the lower contamination degree can thus be prevented from being mixed with the other with the higher contamination degree, thereby keeping the properties of the one with the lower contamination degree (i.e., the first fluid or the second fluid) from deteriorating.

In the third aspect, the communication hole is provided to the partitioning lip so that the parts of the space divided by the partitioning lip are in communication with each other. Thus, even when the pressure release hole is provided only to one of the first seal and the second seal, the parts of the space divided by the partitioning lip are both prevented from having negative pressure therein, thereby preventing the first seal or the second seal from being forced against the rotary shaft due to the negative pressure to be worn.

In the fourth aspect, the pressure release hole and the communication hole are shifted relative to each other in either or both of the rotation direction and the radial direction of the rotary shaft. The first or second fluid leaking through the pressure release hole is thus unlikely to leak through the communication portion, so that mixing of the first and second fluids can be further reliably prevented.

In the fifth aspect, since the pressure release hole is located above in the vertical direction, the first and second fluids, which tend to downwardly accumulate by gravity, are unlikely to leak through the pressure release hole. Mixing of the first and second fluids can thus be further reliably prevented.

In the sixth aspect, the pressure release hole is located at the far side shifted in the rotation direction of the rotary shaft relative to the top in the vertical direction. Even when the first and the second fluids are splattered by the rotation of the rotary shaft, the first and the second fluids are unlikely to leak through the pressure release hole. Mixing of the first and second fluids can thus be further reliably prevented. Further, the position of the communication hole is shifted to the near side in the rotation direction of the rotary shaft relative to the position opposite to the pressure release hole so as not to be opposite to the pressure release hole. Therefore, even when the first or second fluid leaks into one of the divided parts of the space through the pressure release hole, the fluid can be prevented from leaking into the other divided part of the space through the communication hole.

DESCRIPTION OF EMBODIMENT(S)

Exemplary embodiments of the invention will be described below with reference to the attached drawings.

It should be noted that like elements are provided with like reference signs in the exemplary embodiments, and explanation thereof is simplified or omitted.

First Exemplary Embodiment

Figure 1:
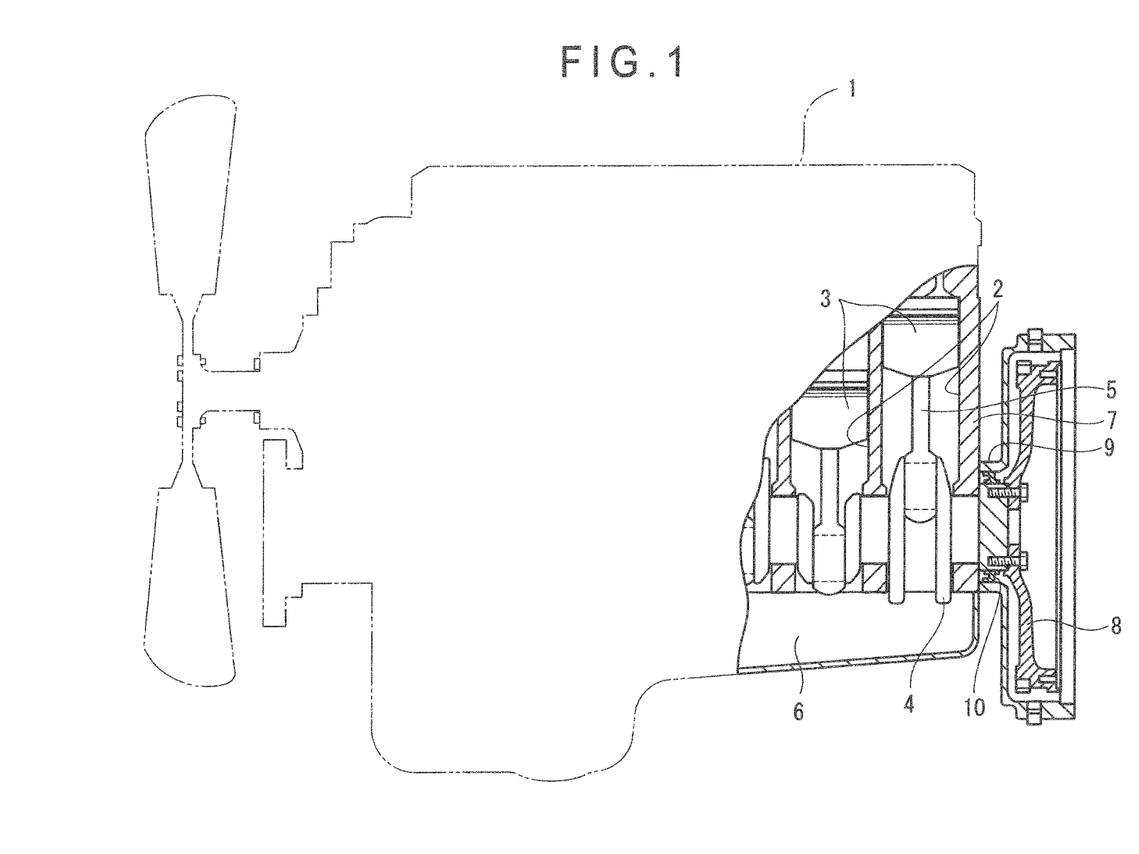
FIG. 1 is a partially sectional view showing the entirety of an engine according to a first exemplary embodiment of the invention.

FIG. 1 is a partially sectional view showing an engine 1 according to a first exemplary embodiment.

As shown in FIG. 1, the engine 1 includes: a plurality of cylinders 2 located therein; a plurality of pistons 3 that receive a pressure of combustion gas to be reciprocated in the cylinders 2; and a crankshaft 4 (a rotary shaft) that converts the reciprocating motion of the pistons 3 into a rotary motion. The pistons 3 are reciprocatably attached to the horizontally located crankshaft 4 through connecting rods 5.

An engine oil (a lubricating oil) is applied to slide parts, i.e., between the cylinders 2 and the pistons 3, between the pistons 3 and the connecting rods 5 and between the connecting rods 5 and the crankshaft 4. The engine oil is reserved in an oil pan 6 provided in a lower part of the engine, and is sucked up by an oil pump (not shown) or the like. The engine oil is then delivered to the inside of the cylinders 2, the pistons 3, the connecting rods 5, the crankshaft 4 and the like, and returned to the oil pan 6 by gravity.

A disc-shaped flywheel 8 is provided at one end of the crankshaft 4 to restrain rotation fluctuation caused by the pistons 3 and achieve smooth rotation. Further, a transmission (not shown) for transmitting a torque to a drive axle is connected to a side of the flywheel 8 opposite to the side where the crankshaft 4 is attached. The flywheel 8 includes a gear located on an outer circumference thereof and configured to mesh with a pinion of a starter, and the transmission similarly includes a number of gears configured to mesh with one another to transmit power. The components of the flywheel 8 and the transmission thus need to be properly lubricated. Accordingly, a lubricating oil different from the engine oil is applied to the flywheel 8 and the transmission so that the flywheel 8 and the transmission are driven in the atmosphere of this lubricating oil to lubricate the components thereof.

Since the lubricating oil for the engine 1 is different from the lubricating oil for the flywheel 8 as described above, an annular oil seal 10 is used to seal a space between an engine block 7 of the engine 1 and a flywheel housing 9 so that the engine oil and the lubricating oil are each prevented from leaking into the other side (i.e., a side near the flywheel 8 or a side near the engine 1). The oil seal 10 has an outer circumferential surface fitted in a shaft hole of the flywheel housing 9 and an inner circumferential surface slidably in contact with an outer circumferential surface of the crankshaft 4.

It is noted that the engine oil for the engine 1 and the lubricating oil for the flywheel 8 have substantially the same viscosity. Since the engine oil is usually used under severe conditions and thus degradation thereof over time is inevitable, the engine oil needs to be replaced more frequently than the lubricating oil for the flywheel 8. Accordingly, these oils have to be isolated from each other using the oil seal 10.

The oil seal 10 of the exemplary embodiment is thus in the form of a two-fluid oil seal usable for two fluids: the lubricating oil for the flywheel 8 with a low contamination degree (a first fluid); and the engine oil for the engine 1 with a high contamination degree (a second fluid).

Figure 2:
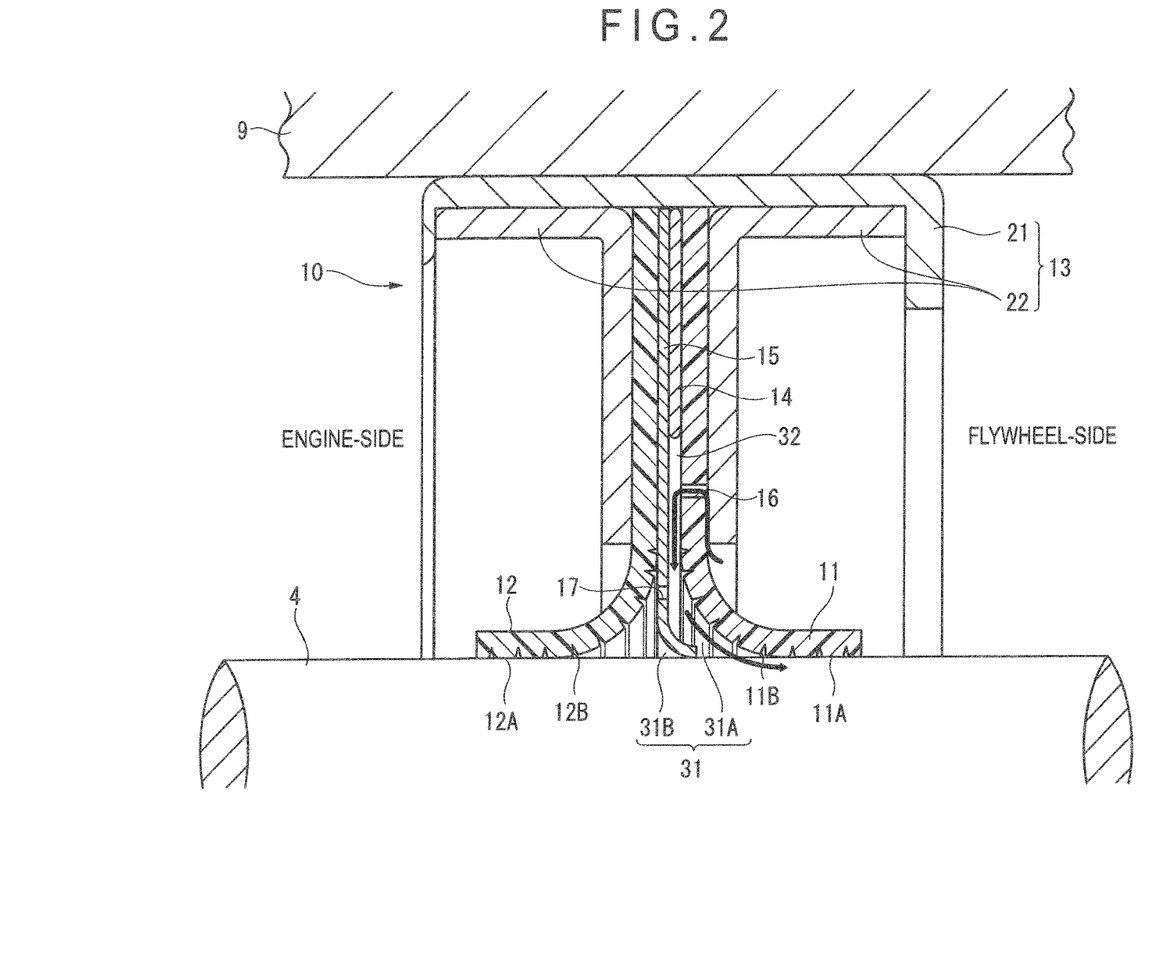
FIG. 2 is an enlarged sectional view showing a part of an oil seal according to the first exemplary embodiment.

As shown in FIG. 2, the oil seal 10 includes: a first seal 11 that defines a seal for the side near the flywheel 8 relative to the crankshaft 4; a second seal 12 that defines a seal for the side near the engine 1 relative to the crankshaft 4; a metal case 13 fitted in the flywheel housing 9 to support the first seal 11 and the second seal 12; a gasket 14 interposed between the first seal 11 and the second seal 12; and a partitioning lip 15 interposed between the first seal 11 and the second seal 12.

The case 13 includes: an outer case 21 in contact with the flywheel housing 9; and a pair of inner cases 22 located at an inner circumferential side of the outer case 21 in plane symmetry with respect to the first seal 11 and the second seal 12, the inner cases 22 each having an L-shaped cross section. The first seal 11, the second seal 12, the gasket 14 and the partitioning lip 15 are interposed between the pair of inner cases 22.

The first seal 11 and the second seal 12 are each a ring member of, for instance, polytetrafluoroethylene (PTFE). An inner circumferential side of the first seal 11 is curved to the side near the flywheel 8, whereas an inner circumferential side of the second seal 12 is curved to the side near the engine 1. The inner circumferential sides of the first and second seals 11 and 12 respectively define seal surfaces 11A, 12A that are slidably in contact with the outer circumferential surface of the rotatable crankshaft 4 to provide a sealing performance on the crankshaft 4. The seal surfaces 11A, 12A are respectively provided with grooves 11B, 12B that helically extend from the outer circumferential side toward the inner circumferential side. The first and second seals 11, 12, which are curved in mutually opposite directions, and the crankshaft 4 in combination define a space 31 (i.e., a space surrounded by these elements). The space 31 is isolated from both of the side near the flywheel 8 and the side near the engine 1 by the first and second seals 11, 12.

Figure 3:
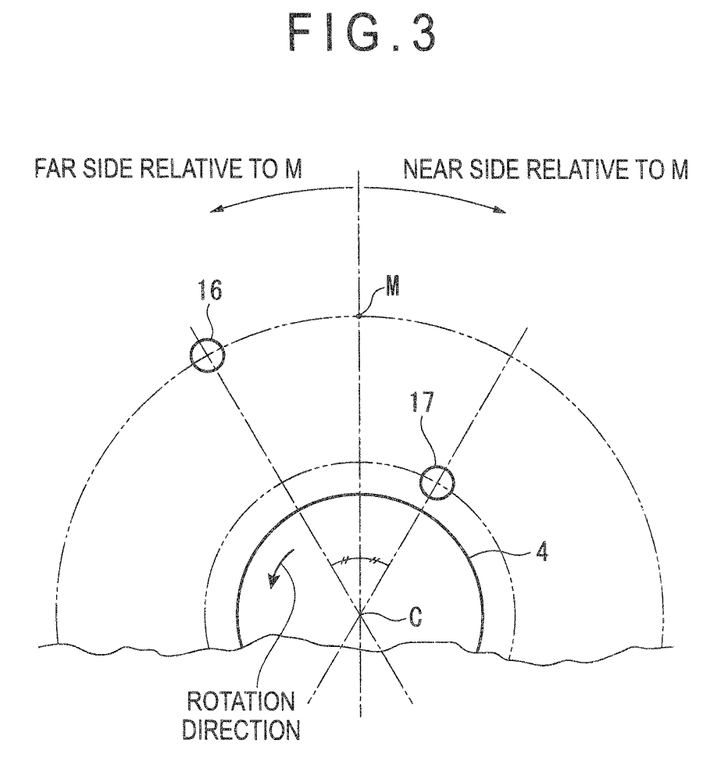
FIG. 3 is an explanatory view showing a positional relationship between a pressure release hole of the oil seal and a communication hole of the oil seal.

The first seal 11 is provided with a pressure release hole 16. The pressure release hole 16 is located at the inner circumferential side relative to the gasket 14 to face a clearance 32 defined between the first seal 11 and the partitioning lip 15. As shown in FIG. 3, the pressure release hole 16 is located above in a vertical direction relative to an axial line C of the crankshaft 4 when the crankshaft 4 is substantially horizontally situated. Specifically, the pressure release hole 16 is located above the crankshaft 4 at a far side shifted in a rotation direction of the crankshaft 4 relative to a top M in the vertical direction. This arrangement is preferable because the lubricating oil for the flywheel 8 is unlikely to leak through the pressure release hole 16. It should be noted that the pressure release hole 16 may be located at any high position (e.g., the position of the top M) as long as the lubricating oil is unlikely to leak through the pressure release hole 16.

The gasket 14, which is a ring member of rubber or the like, is interposed between respective outer circumferential portions of the first seal 11 and the partitioning lip 15.

When the outer case 21 is crimped to the inner cases 22, a surface pressure between the first seal 11, the second seal 12, the gasket 14 and the partitioning lip 15 is increased at a position where the gasket 14 is interposed in the section between the pair of the inner cases 22. The first seal 11, the second seal 12, the gasket 14 and the partitioning lip 15 are thus firmly held between the outer case 21 and the inner cases 22. It should be noted that the respective dimensions of the gasket 14 and the clearance 32 are magnified in FIG. 2 for easy understanding.

The partitioning lip 15, which is a ring member of PTFE or the like similarly to the first seal 11 and the second seal 12, is interposed between the second seal 12 and the gasket 14. An inner circumferential side of the partitioning lip 15 is curved to the side near the flywheel 8 and in contact with the outer circumferential surface of the crankshaft 4. The partitioning lip 15 divides the space 31 in an axial direction of the crankshaft 4 into a divided space 31A toward the flywheel 8 and a divided space 31B toward the engine 1. With this arrangement, even when the lubricating oil in the flywheel housing 9 leaks through the clearance 32 and the pressure release hole 16, the lubricating oil falls down surfaces of the first seal 11 and the partitioning lip 15 into the divided space 31A, and is returned to the side near the flywheel 8. The lubricating oil is thus prevented from mixing with the engine oil for the engine 1.

The partitioning lip 15 is provided with a communication hole 17 through which the divided spaces 31A, 31B are in communication with each other. Although the communication hole 17 is shown in the same vertical section as the pressure release hole 16 in FIG. 2, the communication hole 17 is actually located at a position above in the vertical direction but not opposite to the pressure release hole 16 as shown in FIG. 3. The pressure release hole 16 and the communication hole 17 are thus relatively shifted from positions opposite along the axial line C of the crankshaft 4. Specifically, the communication hole 17 is located at a near side in the rotation direction of the crankshaft 4 relative to the top M and at a radially inner side. With the above arrangement, the lubricating oil leaking through the pressure release hole 16 is prevented from leaking into the divided space 31B through the communication hole 17. While being in communication with each other through the communication hole 17, the divided spaces 31A, 31B are in communication with the side near the flywheel 8 through the pressure release hole 16, so that the pressure in the divided spaces 31A, 31B can be prevented from becoming negative.

When the engine 1 having the above-described configuration is started, the pistons 3 are reciprocated by combustion gas to rotate the crankshaft 4. The oil seal 10 allows the crankshaft 4 to slide on the seal surfaces 11A, 12A to prevent leakage of the lubricating oil for the flywheel 8 by the first seal 11 and leakage of the engine oil for the engine 1 by the second seal 12. When the lubricating oil or the engine oil is leaking into the divided space 31A or 31B, the rotation of the crankshaft 4 makes the oil flow into the groove 11B or 12B, and the oil is helically moved to be discharged out of the oil seal 10 as the crankshaft 4 rotates.

The lubricating oil or the engine oil is discharged along with the air in the space 31. The pressure in the space 31 thus negatively changes. Accordingly, the first exemplary embodiment employs the arrangement where the air in the side near the flywheel 8 is sucked through the clearance between the first seal 11 and the inner case 22 and through the pressure release hole 16, and the divided spaces 31A, 31B are in communication with each other through the communication hole 17. The pressure in the space 31 is thus prevented from becoming negative. As a result, the first seal 11 and the second seal 12 can be slidably in contact with the outer circumferential surface of the crankshaft 4 without being sucked thereon, which contributes to preventing acceleration of the wear of the first seal 11 and the second seal 12 and thus restraining deterioration of the sealing performance.

Since the partitioning lip 15 is provided to divide the space 31 as described above, the lubricating oil leaking through the pressure release hole 16 of the first seal 11 is directed into the divided space 31A by the partitioning lip 15 to be discharged to the side near the flywheel 8 through the groove 11B. Therefore, even when the pressure release hole 16 is provided to the first seal 11, the lubricating oil leaking into the space 31 through the pressure release hole 16 can be prevented from being discharged to the side near the engine 1 to be mixed with the engine oil. Specifically, the lubricating oil for the flywheel 8 with a low contamination degree is prevented from mixing with the engine oil with a high contamination degree to be further contaminated.

Further, the lubricating oil is prevented from being discharged to the side near the engine 1, thereby preventing a problem of a shortage of the lubricating oil at the side for the flywheel 8.

Second Exemplary Embodiment

Next, a second exemplary embodiment of the invention will be described.

Figure 4:
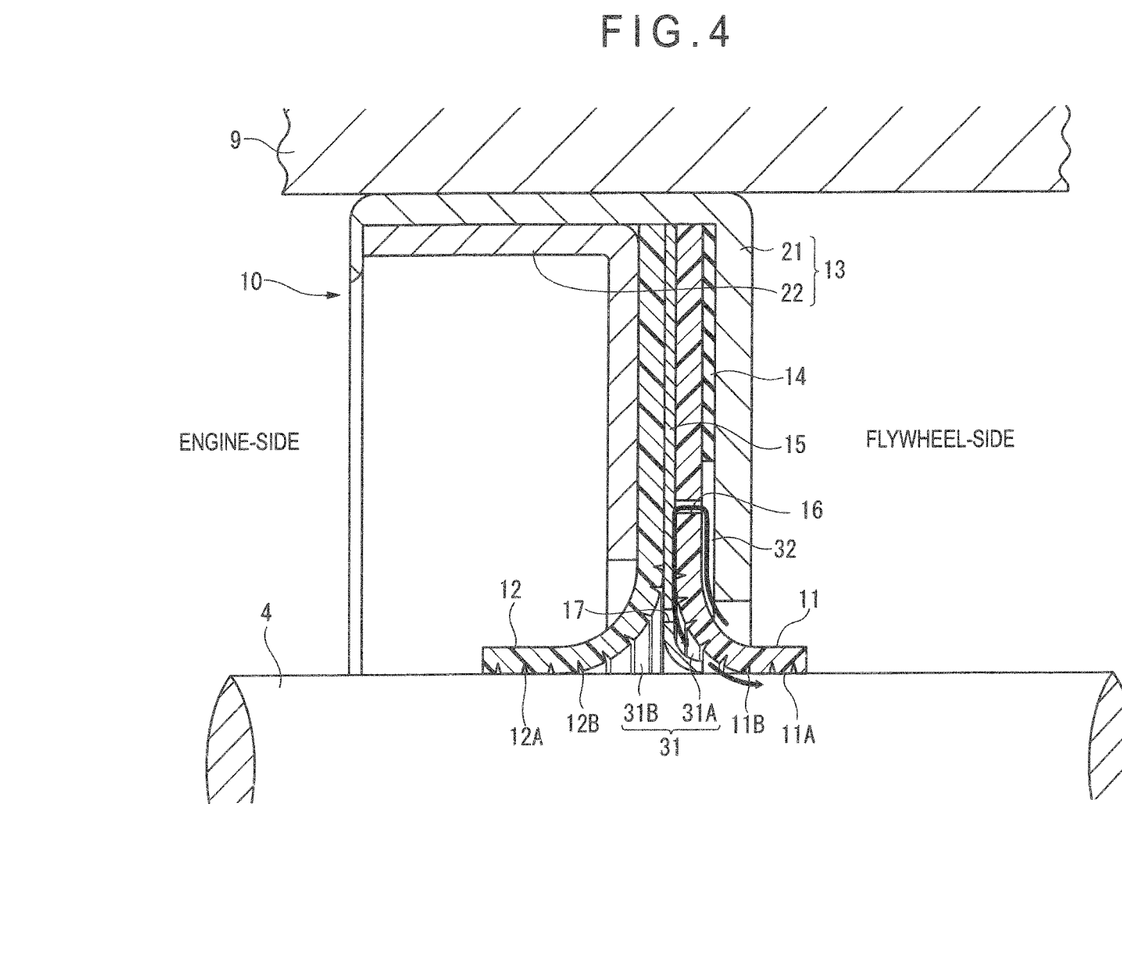
FIG. 4 is an enlarged sectional view showing a part of an oil seal according to a second exemplary embodiment of the invention.

FIG. 4 is an enlarged sectional view showing a part of an oil seal according to the second exemplary embodiment.

As shown in FIG. 4, in the second exemplary embodiment, the case 13 of the first exemplary embodiment is replaced by a case 13 including outer case 21 and inner case 22 each having an L-shaped cross section, between which the first seal 11, the second seal 12, the gasket 14 and the partitioning lip 15 are held.

The oil seal 10 of the second exemplary embodiment is provided with the pressure release hole 16 at the first seal 11 and the communication hole 17 at the partitioning lip 15 in the same manner as that of the first exemplary embodiment. The second exemplary embodiment thus provides the same effects as the first exemplary embodiment.

Incidentally, it should be understood that the scope of the invention is not limited to the above-described exemplary embodiments but includes modifications and improvements compatible with the invention.

For instance, the invention is applicable not only to an oil seal for preventing leakage of the engine oil for the engine 1 and the lubricating oil, but also to a member for preventing leakage of any two fluids. It should be noted that the name of "oil seal" is used according to the invention, not because the invention is intended to prevent merely oil leakage but because it is a common name for a member for preventing any fluid in the art.

In the exemplary embodiments, the inner circumferential side of the partitioning lip 15 is curved to the first seal 11 provided with the pressure release hole 16, but may be curved to the opposite side. However, the former is preferable because the partitioning lip 15 having the inner circumferential side curved to the side provided with the pressure release hole 16 can easily direct a fluid leaking through the pressure release hole 16 to the side where the fluid should be kept.

In the exemplary embodiments, the pressure release hole 16 is provided to the first seal 11, but may alternatively be provided to the second seal 12 or each of the first seal 11 and the second seal 12.

Further, a plurality of pressure release holes may be circumferentially provided at predetermined intervals instead of the single pressure release hole 16.

Two partitioning lips 15 may be provided. Specifically, when the pressure release hole 16 is provided to each of the first seal 11 and the second seal 12 and the inner circumferential sides of the partitioning lips 15 are individually curved to the opposite sealed sides, fluids leaking through the pressure release holes 16 can be individually easily directed to the sealed sides. Alternatively, the single partitioning lip 15 may have an inverted Y-shaped inner circumferential side, divided portions of which are individually curved to the opposite sides.

No communication hole 17 may be provided to the partitioning lip 15 according to the invention. However, in this case, the pressure release hole 16 should preferably be provided to each of the first seal 11 and the second seal 12.

Further, the position of the communication hole 17 may be different from one described above in the exemplary embodiments, but may be determined as desired as long as the fluid leaking through the pressure release hole 16 is prevented from leaking into the divided spaces 31A, 31B through the communication hole 17.

The invention claimed is:

1. An oil seal assembly comprising:
an oil seal; and
a rotary shaft;
wherein the oil seal is configured to be set on an outer circumference of the rotary shaft to prevent leakage of a first liquid and a second liquid, the oil seal defining a first fluid side and a second fluid side for the rotary shaft;
wherein the oil seal comprises:
a first seal configured to seal the first fluid side;
a second seal configured to seal the second fluid side, wherein when the oil seal is set on the outer circumference of the rotary shaft, a space is defined which is surrounded by the first seal, the second seal, and the rotary shaft;
a pressure release hole provided to at least one of the first seal and the second seal so that, when the oil seal is set on the outer circumference of the rotary shaft, the space surrounded by the first seal, the second seal and the rotary shaft is in communication with one of the first fluid side and the second fluid side through the pressure release hole;
a partitioning lip provided between the first seal and the second seal and which is arranged such that, when the oil seal is set on the outer circumference of the rotary shaft, the partitioning lip divides the space into two parts in an axial direction of the rotary shaft; and
a gasket that is interposed between respective outer circumferential portions of the first seal and the partitioning lip;
wherein the pressure release hole and the gasket are arranged such that, when the oil seal is set on the outer circumference of the rotary shaft, the pressure release hole is located closer to the rotary shaft than is the gasket;
wherein the first seal, the second seal, and the partitioning lip are arranged such that, when the oil seal is set on the outer circumference of the rotary shaft, each of the first seal, the second seal, and the partitioning lip is arranged in direct slidable contact with the outer circumference of the rotary shaft;
wherein the partitioning lip is provided with a communication hole through which the divided parts of the space are in communication with each other; and
wherein the pressure release hole and the communication hole are arranged such that, when the oil seal is set on the outer circumference of the rotary shaft and when an axial line of the rotary shaft is set substantially horizontal:

the pressure release hole and the communication hole are located above the axial line, the pressure release hole and the communication hole are arranged at different distances from the outer circumference of the rotary shaft in a radial direction of the rotary shaft, and the pressure release hole and the communication hole are not radially aligned with each other such that the pressure release hole and the communication hole are shifted from each other in a rotation direction of the rotary shaft.

2. The oil seal assembly according to claim 1, wherein the pressure release hole is provided to the first seal or the second seal that prevents leakage of the first fluid or the second fluid having a lower contamination degree than the other.

3. The oil seal assembly according to claim 1, wherein the pressure release hole and the communication hole are arranged such that, when the oil seal is set on the outer circumference of the rotary shaft and when the axial line of the rotary shaft is set substantially horizontal, the pressure release hole is located farther from the outer circumference of the rotary shaft in the radial direction than is the communication hole.

4. The oil seal assembly according to claim 3, wherein the pressure release hole and the communication hole are arranged such that, when the oil seal is set on the outer circumference of the rotary shaft, the pressure release hole is located at a far side shifted in the rotation direction of the rotary shaft relative to a top in a vertical direction, and the communication hole is shifted to a near side in the rotation direction of the rotary shaft relative to a position opposite to the pressure release hole.

* * * * *